April 10, 1956     J. BLAIR ET AL     2,741,638
RECOVERY OF GLYCEROL
Filed Oct. 17, 1952
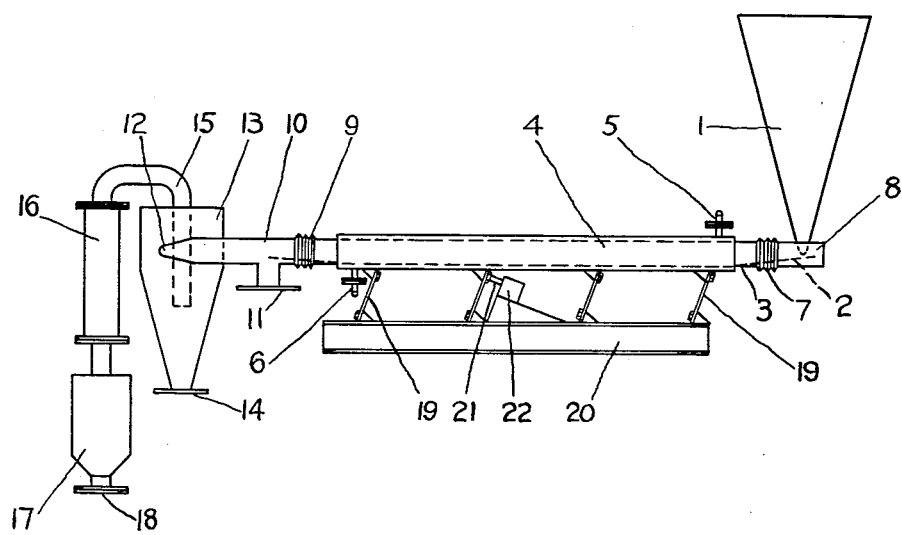
INVENTORS:
James Blair,
Walter Anderson Caldwell,
Thomas Aucott McLellan,
BY Cushman, Darby & Cushman
ATTORNEYS.

United States Patent Office 2,741,638
Patented Apr. 10, 1956

2,741,638
RECOVERY OF GLYCEROL

James Blair, Saltcoats, Walter A. Caldwell, West Kilbride, and Thomas A. McLellan, Irvine, Scotland, assignors to Imperial Chemical Industries Limited, a corporation of Great Britain Application October 17, 1952, Serial No. 315,322

Claims priority, application Great Britain December 3, 1951

4 Claims. (Cl. 260—637)

This invention relates to improvements in or relating to the recovery of glycerol from fermentation liquors produced by the fermentation of carbohydrates such as sugars, starch, molasses and the like. Liquors of this type are generally unsuitable for treatment by the distillation processes ordinarily employed in refining crude soap-lye or crude saponification glycerol.

The nature of the carbohydrate material employed for the fermentation and the manner in which the fermentation is carried out may considerably influence the composition of the crude liquor. These liquors however will always contain a large ratio of non-volatile organic matter to glycerol, and this renders them difficult to handle by distillation. Unfermented and/or unfermentable carbohydrate materials are prominent amongst the organic materials present, and the nature or amount of the organic materials has hitherto not only rendered it impracticable to achieve a satisfactory result by ordinary distillation methods, but has prevented successful application of normal distillation methods even after the concentrated liquor has been extracted with solvents capable of dissolving glycerol, such as industrial spirits or methyl alcohol.

The object of the present invention is to provide a process particularly suitable for the continuous recovery of glycerol from fermentation liquors in which process the time of contact with a heated surface of the glycerol in the previously concentrated fermentation liquor is a minimum and in which process the residue is easily removed.

According to the present invention the process for the recovery of glycerol from a concentrated fermentation liquor comprises mixing a concentrated fermentation liquor with a granular material in an amount and for a time sufficient to form a free flowing mixture, continuously agitating said mixture while heating it under reduced pressure sufficient to distill glycerol-containing vapours therefrom, and continuously replacing the spent and removed mixture by fresh free flowing mixture.

The glycerol-containing vapours may be wholly condensed and the glycerol recovered by distillation. Alternatively the glycerol may be directly recovered by fractional condensation of the vapours.

Suitable granular materials include, for example, sand, coke, fuller's earths, kieselguhr and anhydrous sodium sulphate. Kieselguhr is preferred because of its superior ability to absorb concentrated fermentation liquors, for example, a concentrated fermentation liquor which can be extended on sand to the amount of 10% by weight to give a porous mass can be absorbed to the extent of 150% by kieselguhr to give a dry powder. If, however, a large quantity of concentrated liquor is mixed with kieselguhr mixing should not be prolonged unduly since prolonged mixing tends to cause change from the powdery to a plastic consistency.

Agitation of the free flowing mixture may be achieved by any convenient mechanical means such as, for example, rakes or paddle stirrers or any of the known stirring devices as are used for the mixing of solids or by vibrating the vessel containing the free flowing mixture.

Any suitable procedure for removing and replacing the spent mixture by fresh free flowing mixture may be used. Thus the fresh free flowing mixture may be fed in at one end of a substantially horizontally heated, for example steam jacketed, tube so as to form a layer thereon and the tube vibrated so that the particles of the layer travel to the other end of the tube for removal.

The layer may be heated by any suitable means as, for example, a steam heated jacket, radiant heat or high frequency heating.

The granular material may be recovered for re-use, for example, by washing with water and drying and if necessary burning off the coat of residue from the granules.

A preferred method of carrying out the invention is illustrated by the following example in which the parts are parts by weight and with reference to the accompanying diagrammatic drawing which is an elevation of a suitable apparatus.

Example 18 lb. of concentrated ethanol and acetaldehyde-free fermentation liquor, consisting of 16% by weight glycerol, 24% by weight water and 60% by weight total solids (determined at 160° C.) obtained by concentrating and stripping ethanol and acetaldehyde from the liquor obtained by fermenting blackstrap molasses are mixed with 12 lb. by weight of kieselguhr for 2–3 minutes in a Werner Pfleiderer mixer to give a uniform solid mixture.

The solid mixture so obtained is fed into a feed hopper 1 from which it is fed at a rate of 20 to 25 kilos per hour to a feed tray 2 which is rigidly attached to a tube 3 provided with a jacket 4 which has an inlet 5 and an outlet 6 for a heating fluid. The jacket 4 is 215 cms. long and the internal diameter of the tube 3 is 6.35 cms. The jacket temperature is maintained at 180° to 200° C. by steam heating and the tube is vibrated at a frequency of 1500 cycles per minute. The pressure in the tube is maintained at 2 mms.

The inlet end of the tube 3 is attached by means of a flexible coupling 7 to a closed tube 8 through which the feed hopper 1 projects to deliver solid material to the feed tray 2. The tube 3 is also connected by means of a flexible coupling 9 to an extension piece 10 provided with an outlet 11 for spent solid material. The vapours from the distillation pass from the tangential inlet 12 into a cyclone 13 wherein any dust present leaves by the outlet 14 and the vapours leave by pipe 15 to pass to the condenser 16 from which the condensate passes through the receiver 17 to the outlet 18. The jacketed tube 3 is mounted by means of spring leaves 19 on a rigid support 20, the angle between the spring leaves and the support being 70°. The passage of the solid mixture through the tube 3 is caused by vibrating the tube by means of the piston 21 of the hydraulic pump 22 which acts at right angles to the leaves 19.

The distillate obtained is an aqueous glycerol containing about 90% glycerol by weight together with traces of acrolein and waxy impurities.

The spent solid material leaving the outlet 11 is directed to a washer for removal of the residue by a water wash. After washing, drying and burning off the residue on the granules, the granules are ready for mixing with fresh concentrated fermentation liquor.

What we claim is:

1. A process for the recovery of glycerol from a concentrated fermentation liquor which comprises mixing the concentrated fermentation liquor with an inert, inorganic granular material to form a freely flowing mixture, continuously agitating said mixture while distilling glycerol-containing vapors therefrom by heating said mixture externally under reduced pressure, and continuously removing spent mixture and replacing it by fresh freely flowing mixture.

2. A process as claimed in claim 1 wherein the glycerol-containing vapours are condensed and the glycerol recovered by distillation.

3. A process as claimed in claim 1 wherein the glycerol in the glycerol-containing vapours is recovered directly by fractional condensation of the vapours.

4. A process as claimed in claim 1 wherein the granular material is kieselguhr.

References Cited in the file of this patent
UNITED STATES PATENTS

| | | |
|---|---|---|
| 2,153,704 | Werner | Apr. 11, 1939 |
| 2,315,423 | Hildebrandt | Mar. 30, 1943 |
| 2,365,897 | Morgan | Dec. 26, 1944 |
| 2,514,797 | Robinson | July 11, 1950 |
| 2,620,295 | Hodge | Dec. 2, 1952 |